April 13, 1948.  L. J. SCOTT  2,439,697
DEVICE FOR DISPENSING LUMP SUGAR
Filed Oct. 23, 1946
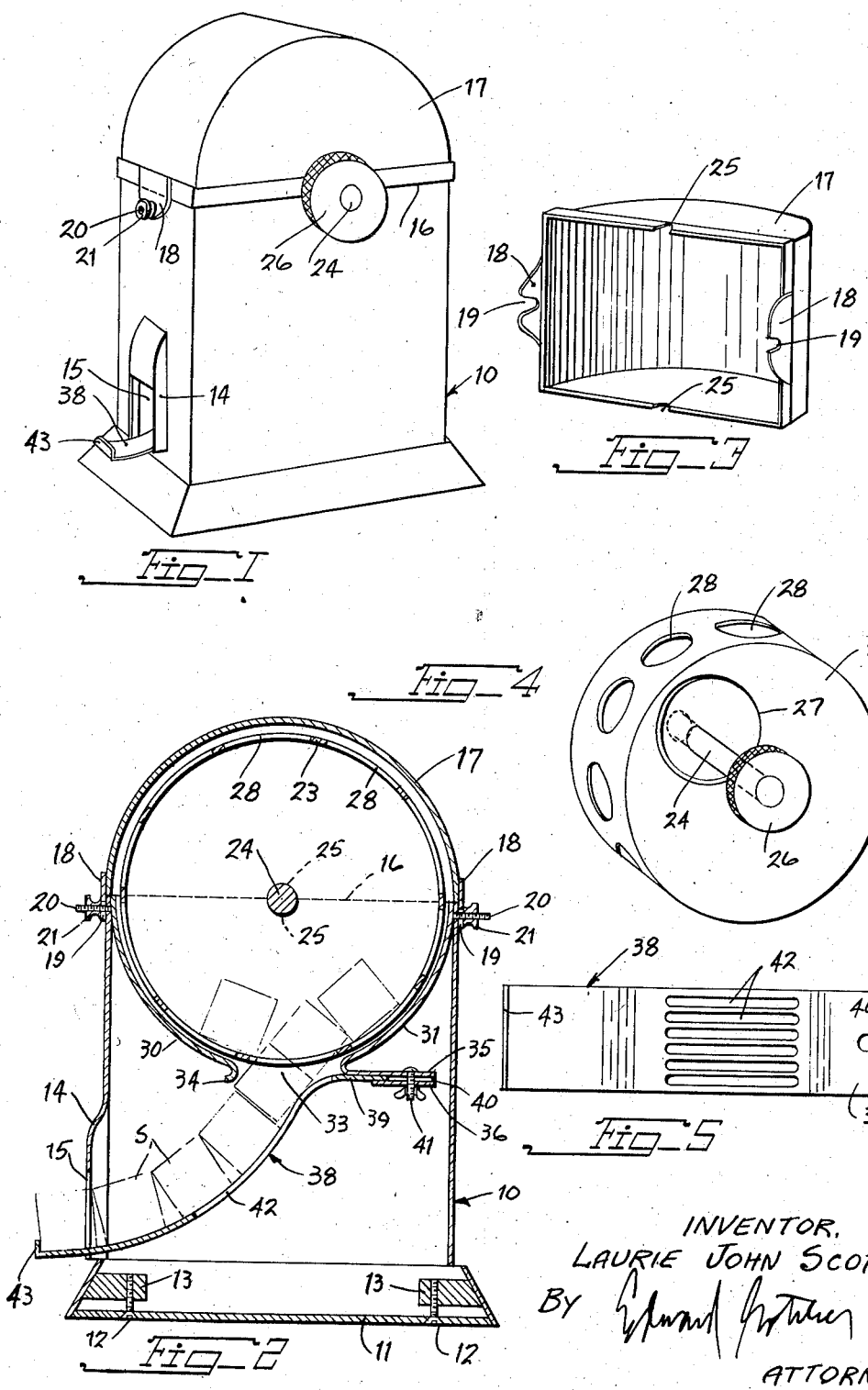
INVENTOR.
LAURIE JOHN SCOTT
ATTORNEY.

Patented Apr. 13, 1948

2,439,697

UNITED STATES PATENT OFFICE 2,439,697

DEVICE FOR DISPENSING LUMP SUGAR

Laurie John Scott, Chilliwack, British
Columbia, Canada

Application October 23, 1946, Serial No. 705,085

7 Claims. (Cl. 312—94)

This invention relates to new and useful improvements in devices for dispensing lump sugar and has more particular reference to a semi-automatic lump sugar dispensing device in which one lump of sugar is normally accessible and when this lump of sugar is removed another lump of sugar automatically takes its place.

More particularly, the invention contemplates a sugar dispensing device which may be rested on a counter or table and which normally dispenses lump sugar one piece at a time and which is provided with a knob turnable to break up any lump sugar jam which may occur in the device.

It is also proposed that the sugar dispensing device be provided with a casing having a removable cover by which the device may be refilled with sugar when needed.

Still further, a drum is rotatively mounted in the casing and is provided with a large side opening through which it may be filled with sugar. It is proposed that this drum have a plurality of peripheral openings through which one lump of sugar at a time may freely pass.

It is also proposed to provide the casing with baffles extending along the sides of the drum for covering certain of said peripheral openings and for forming a throat passage at the bottom of the drum through which lump sugar may freely pass, one piece at a time.

It is also proposed to provide the casing with a novel chute extending from the throat passage to a sugar dispensing opening where the dispensed lump of sugar is accessible.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure—

Fig. 1 is a perspective view of a device for dispensing lump sugar constructed in accordance with this invention.

Fig. 2 is an enlarged transverse vertical sectional view of Fig. 1.

Fig. 3 is a perspective view of the cover of the device, looking at its bottom side.

Fig. 4 is a perspective view of the drum of the device.

Fig. 5 is a plan view of the chute of the device.

The device for dispensing lump sugar, in accordance with this invention, includes a casing 10 for resting on a table or other surface. This casing is provided with a flat bottom wall 11. The wall 11 is removably held by several screws 12 which engage lugs 13 formed in the bottom portion of the casing 10. At one side, the casing 10 is provided with an outwardly embossed section 14 having an opening 15 through which dispensed lump sugar is available, as will hereafter be further explained. The casing 10 has an open top 16.

A cover 17 is removably engaged on the open top 16 of the casing 10 for closing it. This cover 17 is of hollow semi-cylindrical form. At the sides it is provided with lugs 18 having slots 19. Complementary studs 20 project from the top portion of the casing 10 and are provided with clamp nuts 21 by which the cover 17 may be securely held in place and released when desired.

A hollow drum 23 for holding lump sugar is rotatively mounted in the top portion of the casing 10. This drum 23 has an axial shaft 24, the end portions of which project and are normally rested upon semi-circular cutouts 25 formed in the adjacent side walls of the cover 17 and the casing 10. One of the projecting ends of the shaft 24 is provided with a knob 26 by which the drum 23 may be manually turned. One side wall of the drum 23 has a large opening 27 through which the drum 23 may be filled with lumps of sugar. The periphery of the drum 23 is provided with a plurality of closely spaced openings 28 which are of a size to permit one lump of sugar to pass through each opening at one time.

Baffles 30 and 31 are fixedly mounted in the top portion of the casing 10 and extend along the sides of the drum 23 for covering certain of the peripheral openings 28. These baffles 30 and 31 have their bottom portions spaced from each other forming a throat passage 33 at the bottom of the drum 23 through which lumps of sugar may pass. The baffle 30 has its bottom end 34 bent laterally. The baffle 31 has a much larger bottom end portion 35 bent laterally into a flat plane. A plate 36 is fixedly mounted between the walls of the casing 10 and is slightly spaced from the straight portion 35.

A chute 38 extends from the throat passage 33 to the sugar dispensing opening 15. This chute 35 has a horizontal top portion 39 adapted to engage between the straight portion 35 and the plate 36. The end 39 has a slot 40 which straddles a bolt and nut 41 mounted through the straight portion 35 and plate 36 by which the chute 38 may be firmly clamped in position. It is possible to shift the chute 38 slightly laterally to selected distances so as to control the size of the throat opening 33 to insure dispensing of one lump of sugar at a time.

The central portion of the cute 38 is provided with a plurality of slits 42 through which powdered and small pieces of sugar may fall into the bottom of the casing 19 so as not to be dispensed. The outer end of the chute 38 has an upturned lip 43 which prevents the sugar from falling on to the table or floor.

The operation and use of the sugar dispensing device may be understood from the following:

The nuts 21 are loosened and then the cover 17 may be lifted off. The drum 23 is turned so that the opening 27 is accessible. The drum 23 is now filled with lumps of sugar. The cover 17 is then replaced.

The lumps of sugar may be dispensed by merely turning the knob 26 into a correct position. The lumps of sugar will then flow from the drum 23 through one of the openings 28, the one located above the throat 33 and down the chute 38. They will form a line of lumps of sugar, as indicated by the dot and dash lines S. The lowermost lump of sugar will engage against the lip 43 and support all the other lumps in position.

The lowermost lump of sugar may be picked off the bottom of the chute 38 whenever desired. The lumps of sugar above it will merely move down so that a new lump is now in the bottom position against the lip 43. In this way the entire contents of the dispensing device may be used up as needed. Should a jam occur and the lumps of sugar cease to flow down the chute 38, it is merely necessary to jiggle the knob 26 very slightly to restart the flow.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A device for dispensing lump sugar, comprising a casing for resting on a table or other object and having an open top and a lump sugar dispensing opening at the bottom of one of its side walls, a cover removably engaged on the top of said casing for closing said open top, a drum for holding lump sugar and having an axial shaft rotatively mounted across the open top of said casing and being provided with a large opening in one side wall by which it may be filled with lump sugar and being also provided with a plurality of peripheral openings of sizes which will permit one lump of sugar to freely pass through each opening at one time, a knob on said shaft for turning said drum, baffles mounted in the top portion of said casing and extending along the sides of said drum for covering certain of said peripheral openings and forming a throat passage at the bottom of said drum for lump sugar to pass through, and a lump sugar holding chute extending from said throat passage to said sugar dispensing opening.

2. A device for dispensing lump sugar, comprising a casing for resting on a table or other object and having an open top and a lump sugar dispensing opening at the bottom of one of its side walls, a cover removably engaged on the top of said casing for closing said open top, a drum for holding lump sugar and having an axial shaft rotatively mounted across the open top of said casing and being provided with a large opening in one side wall by which it may be filled with lump sugar and being also provided with a plurality of peripheral openings of sizes which will permit one lump of sugar to freely pass through each opening at one time, a knob on said shaft for turning said drum, baffles mounted in the top portion of said casing and extending along the sides of said drum for covering certain of said peripheral openings and forming a throat passage at the bottom of said drum for lump sugar to pass through, and a lump sugar holding chute extending from said throat passage to said sugar dispensing opening, said cover being of hollow semi-cylindrical shape to conform with the top portion of said drum.

3. A device for dispensing lump sugar, comprising a casing for resting on a table or other object and having an open top and a lump sugar dispensing opening at the bottom of one of its side walls, a cover removably engaged on the top of said casing for closing said open top, a drum for holding lump sugar and having an axial shaft rotatively mounted across the open top of said casing and being provided with a large opening in one side wall by which it may be filled with lump sugar and being also provided with a plurality of peripheral openings of sizes which will permit one lump of sugar to freely pass through each opening at one time, a knob on said shaft for turning said drum, baffles mounted in the top portion of said casing and extending along the sides of said drum for covering certain of said peripheral openings and forming a throat passage at the bottom of said drum for lump sugar to pass through, and a lump sugar holding chute extending from said throat passage to said sugar dispensing opening, said cover being of hollow semi-cylindrical shape to conform with the top portion of said drum, slotted lugs mounted upon the bottom portion of said cover and cooperative with studs and nuts mounted on said casing by which the cover may be clamped in position.

4. A device for dispensing lump sugar, comprising a casing for resting on a table or other object and having an open top and a lump sugar dispensing opening at the bottom of one of its side walls, a cover removably engaged on the top of said casing for closing said open top, a drum for holding lump sugar and having an axial shaft rotatively mounted across the open top of said casing and being provided with a large opening in one side wall by which it may be filled with lump sugar and being also provided with a plurality of peripheral openings of sizes which will permit one lump of sugar to freely pass through each opening at one time, a knob on said shaft for turning said drum, baffles mounted in the top portion of said casing and extending along the sides of said drum for covering certain of said peripheral openings and forming a throat passage at the bottom of said drum for lump sugar to pass through, and a lump sugar holding chute extending from said throat passage to said sugar dispensing opening, the adjacent walls of said casing and cover being provided with semi-circular openings through which the end portions of said shaft pass.

5. A device for dispensing lump sugar, comprising a casing for resting on a table or other object and having an open top and a lump sugar dispensing opening at the bottom of one of its side walls, a cover removably engaged on the top of said casing for closing said open top, a drum for holding lump sugar and having an axial shaft rotatively mounted across the open top of said casing and being provided with a large opening in one side wall by which it may be filled with lump sugar and being also provided with a plurality of peripheral openings of sizes which will permit one lump of sugar to freely pass through each opening at one time, a knob on said shaft for turning said drum, baffles mounted in the top portion of said casing and extending along the sides of said drum for covering certain of said peripheral openings and forming a throat passage at the bottom of said drum for lump sugar to pass through, and a lump sugar holding chute extending from said throat passage to said sugar dispensing opening, said lump sugar holding chute comprising a strip having a horizontal top portion, and means for holding said top portion of said strip in various positions for controlling passage of lump sugar through said throat opening.

6. A device for dispensing lump sugar, comprising a casing for resting on a table or other object and having an open top and a lump sugar dispensing opening at the bottom of one of its side walls, a cover removably engaged on the top of said casing for closing said open top, a drum for holding lump sugar and having an axial shaft rotatively mounted across the open top of said casing and being provided with a large opening in one side wall by which it may be filled with lump sugar and being also provided with a plurality of peripheral openings of sizes which will permit one lump of sugar to freely pass through each opening at one time, a knob on said shaft for turning said drum, baffles mounted in the top portion of said casing and extending along the sides of said drum for covering certain of said peripheral openings and forming a throat passage at the bottom of said drum for lump sugar to pass through, and a lump sugar holding chute extending from said throat passage to said sugar dispensing opening, said lump sugar holding chute comprising a strip having a horizontal top portion, and means for holding said top portion of said strip in various positions for controlling passage of lump sugar through said throat opening, said strip also having a central slotted portion through which small pieces and powdered sugar may fall.

7. A device for dispensing lump sugar, comprising a casing for resting on a table or other object and having an open top and a lump sugar dispensing opening at the bottom of one of its side walls, a cover removably engaged on the top of said casing for closing said open top, a drum for holding lump sugar and having an axial shaft rotatively mounted across the open top of said casing and being provided with a large opening in one side wall by which it may be filled with lump sugar and being also provided with a plurality of peripheral openings of sizes which will permit one lump of sugar to freely pass through each opening at one time, a knob on said shaft for turning said drum, baffles mounted in the top portion of said casing and extending along the sides of said drum for covering certain of said peripheral openings and forming a throat passage at the bottom of said drum for lump sugar to pass through, and a lump sugar holding chute extending from said throat passage to said sugar dispensing opening, and having an outer end formed with an upwardly directed lip which permits one lump of sugar to be always in position to be picked off.

LAURIE JOHN SCOTT.

REFERENCES CITED

The following references are of record in the file of this patent:

UNITED STATES PATENTS

| Number | Name | Date |
|---|---|---|
| 1,127,520 | Rosen | Feb. 9, 1915 |
| 1,929,788 | Myers | Oct. 10, 1933 |